United States Patent
Carr et al.

(10) Patent No.: US 8,924,610 B1
(45) Date of Patent: Dec. 30, 2014

(54) SAS/SATA STORE-AND-FORWARD BUFFERING FOR SERIAL-ATTACHED-SCSI (SAS) STORAGE NETWORK

(71) Applicant: PMC-Sierra US, Inc., Sunnyvale, CA (US)

(72) Inventors: Larrie Simon Carr, Kelowna (CA); Sanjay Goyal, Roseville, CA (US); Kaihong Wang, Shanghai (CN); Atit Patel, Breinigsville, PA (US)

(73) Assignee: PMC-Sierra US, Inc., Sunnyvale, CA (US)

( * ) Notice: Subject to any disclaimer, the term of this patent is extended or adjusted under 35 U.S.C. 154(b) by 0 days.

(21) Appl. No.: 13/753,255

(22) Filed: Jan. 29, 2013

(51) Int. Cl.
 *G06F 13/36* (2006.01)
(52) U.S. Cl.
 USPC .......... 710/74; 710/28; 710/33; 710/8; 710/9; 710/10; 710/72; 710/73; 710/308; 711/112; 711/114; 711/162
(58) Field of Classification Search
 USPC ........ 710/8–10, 28, 33, 72–74; 711/112, 114, 711/162
 See application file for complete search history.

(56) References Cited

U.S. PATENT DOCUMENTS

| | | | |
|---|---|---|---|
| 7,340,551 B2 * | 3/2008 | Elliott et al. | ................... 710/309 |
| 7,529,877 B2 | 5/2009 | Bashford et al. | |
| 7,539,798 B2 | 5/2009 | Voorhees et al. | |
| 7,739,432 B1 | 6/2010 | Shaw et al. | |
| 7,774,424 B1 * | 8/2010 | Bailey et al. | ................... 709/211 |
| 8,275,925 B2 * | 9/2012 | Day | ................................. 710/74 |
| 8,645,590 B2 * | 2/2014 | Voorhees et al. | ............... 710/29 |
| 8,732,380 B2 * | 5/2014 | Jinno et al. | ..................... 710/316 |
| 2008/0022026 A1 * | 1/2008 | Yang et al. | ..................... 710/200 |

OTHER PUBLICATIONS

Penokie, "Information technology—SAS Protocol Layer—2 (SPL-2)", T10/2228-D Revision 05, May 10, 2012, 830 pages, ANSI INCITS, USA.
Dell et al., "Serial ATA International Organization: Serial ATA Revision 3.0", Gold Revision, Jun. 2, 2009, 663 pages, Serial ATA International Organization, USA.
Elliot, "05-381r7 SAS-2 Multiplexing", http://www.t10.org/ftp/t10/document.05/05-381r7.pdf, Nov. 6, 2006, 101 pages, T10 Technical Committee, USA.

* cited by examiner

*Primary Examiner* — Tammara Peyton
(74) *Attorney, Agent, or Firm* — Dennis R. Haszko (57) ABSTRACT

SAS/SATA Store-Forward (SSSF) buffering enables SAS/SATA block storage devices capable of slower physical link rates to transfer data at a SAS topology data rate. 6 Gbps SAS and SATA disk drives can exchange data at 12 Gbps with 12 Gbps hosts through 12 Gbps SAS expanders employing an SSSF device. The SSSF device improves data transfer performance in the storage area network by optimizing host-side link utilization. The device includes a host-side interface communicating with the host at a host-side rate, a drive-side interface communicating with the target at a drive-side rate equal to or less than the host-side rate, a buffer receiving SAS frames or SATA FIS's, and control logic to control communication between the host-side interface and buffer at the host-side rate and between the drive-side interface and the buffer at the drive-side rate.

26 Claims, 9 Drawing Sheets

SAS/SATA STORE-AND-FORWARD BUFFERING FOR SERIAL-ATTACHED-SCSI (SAS) STORAGE NETWORK

FIELD

The present disclosure relates generally to storage networks. More particularly, the present disclosure relates to methods and devices for optimizing host link utilization in storage networks such as in Serial-Attached-SCSI (SAS) and Serial ATA (Advanced Technology Attachment) topologies.

BACKGROUND

Serial Attached SCSI (Small Computer System Interface), or SAS, is a connection-oriented protocol that allows storage devices, such as servers and disk drives, to communicate through a network of high-speed serial physical interconnects. Connections among host devices (e.g. servers) and target devices (e.g. hard disk drives, or "HDD"s, or simply "drives") are managed by intermediate devices called SAS expanders (or simply "expanders"). The SAS expanders act as connection management agents similar to a switch element having physical connections to multiple host devices or target devices simultaneously.

The SAS protocol (ANSI INCITS. T10/2228-D Revision 5—SAS Protocol Layer—2(SPL-2): May 10, 2012) specifies a protocol stack that provides serial physical interconnects that can be used to connect target devices such as hard disk drives and host devices together. It specifies the transport layer protocols to transport SCSI commands, serial ATA (SATA) commands and management commands among storage devices. The protocol is intended to be used in conjunction with SCSI and ATA command sets. Thus, target devices may include either SAS target devices, or serial SATA-compliant target devices such as SATA hard disk drives and other SATA storage devices which are widely used in the consumer personal computer (PC) industry. The SAS protocol defines the function of a SAS expander device which is part of the service delivery subsystem and facilitates communication between target devices. Thus, the SAS expanders provide the switching and routing function among the target devices that are attached to it.

Simple SAS topologies may include multiple target devices connected through a single expander to a host device, and complex topologies may include multiple target devices connected through multiple expanders to multiple host devices in a tree structure. Each target device, expander and host has a unique dedicated SAS address.

The SAS protocol adopts a point-to-point connection mechanism. Similarly, the SATA specification generally describes a point-to-point interface between a host and an ATA device. The target device and host device communicate to each other through an OPEN request. The OPEN request from a host device or a target device flows through one or more expanders to reach the target device or host device, respectively. The expander performs a point-to-point connection in order to route the OPEN request from the source to the target. The communication link is considered set-up when an OPEN request from the target device is accepted by the host device, or an OPEN request from the host device is accepted by the target device. At this point, information can be transferred between the host device and target device.

Host devices, expander devices, and target devices may be capable of supporting different link speeds. For example, the SAS protocol supports both "fast" 12 Gbps (or "12G") and "slow" 6 Gbps (or "6G") link rates. 6G SAS target devices are now in common use and 12G SAS target devices are becoming available. 6G SATA target devices are also in common use, but it is not presently expected that 12G SATA devices will become available. While it is expected that, over time, 12G SAS target devices will achieve widespread adoption, the first generation of 12G SAS topologies is likely to have only 6G SATA and 6G SAS hard drives. In any event, there will eventually remain an ongoing need to support 6G SAS and SATA legacy devices.

Figure 1:
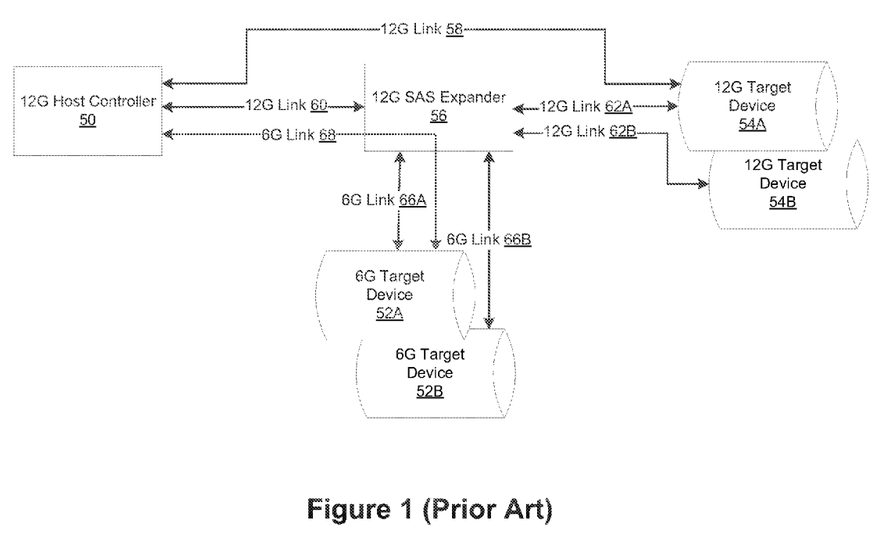
FIG. 1 is a schematic representation of a known storage area network showing the reduction of a host-side connection link rate when connected to a slow target device due to rate matching.

When "fast" host controllers are mixed with "slow" target devices in a particular SAS topology, the connection operates at the fastest common rate. If this fastest common rate is not the fastest speed for the SAS topology, however, then the throughput of the system is reduced. This feature is called "rate matching". Reference in this regard is made to FIG. 1 which shows an exemplary SAS topology containing both fast (12G) and slow (6G) target devices. The topology in FIG. 1 includes a 12G host controller 50, 6G target devices 52A, 52B, 12G target devices 54A, 54B, and a 12G SAS expander 56.

The host controller 50 may interconnect at 12G via a link 58 directly to a 12G drive 54A and may also connect at 12G via a link 60 to the SAS expander 56 which is connected at 12G via links 62A, 62B, to the 12G target devices 54A, 54B. The host controller 50 may also connect to the 6G target devices 52A, 52B via the SAS expander 56, but in this case the links 66A, 66B between the SAS expander 56 and the target devices 52A, 52B are limited to 6G; thus, a link 68 formed between the host controller 50 and 6G target device 52A, for example, is also limited to 6G.

In order to sustain 6G link 68, the 12G phy of the host controller 50 must insert a deletable primitive for every other primitive destined for the 6G target device 52A. This causes the host controller 50 to communicate at a 6G logical link rate despite its phy operating at 12G. The host controller 50 therefore has a connection open twice as long as if it were connected to a 12G target. This reduces the efficiency of the data transfer to about 50% as the host controller 50 could have communicated to two targets in the same amount of time.

In order to address this problem, the SAS-2 protocol adds a multiplexing feature which provides time sharing of a faster physical link by multiples of two logical link rates. Accordingly, and with reference to FIG. 2, a 12G multiplex-enabled host 80 can connect to two 6G devices 52A, 52B through a 12G SAS expander 82 which also has the multiplexing feature enabled. (The host 80 is shown as being linked through a 12G SAS expander 56 to the multiplex-enabled expander 82, but could alternatively be linked directly to the latter.) In this case, the host-side link 84 retains a 12G link rate while corresponding 6G links 86A, 86B are formed to the respective 6G devices 52A, 52B. It thus remains possible for the host controller 80 to form 12G links 88A, 88B with other 12G devices 90A, 90B via the 12G SAS expander 56. Thus, the multiplexing feature of the SAS-2 protocol, while addressing the problem of rate-matching, introduces new disadvantages.

Figure 2:
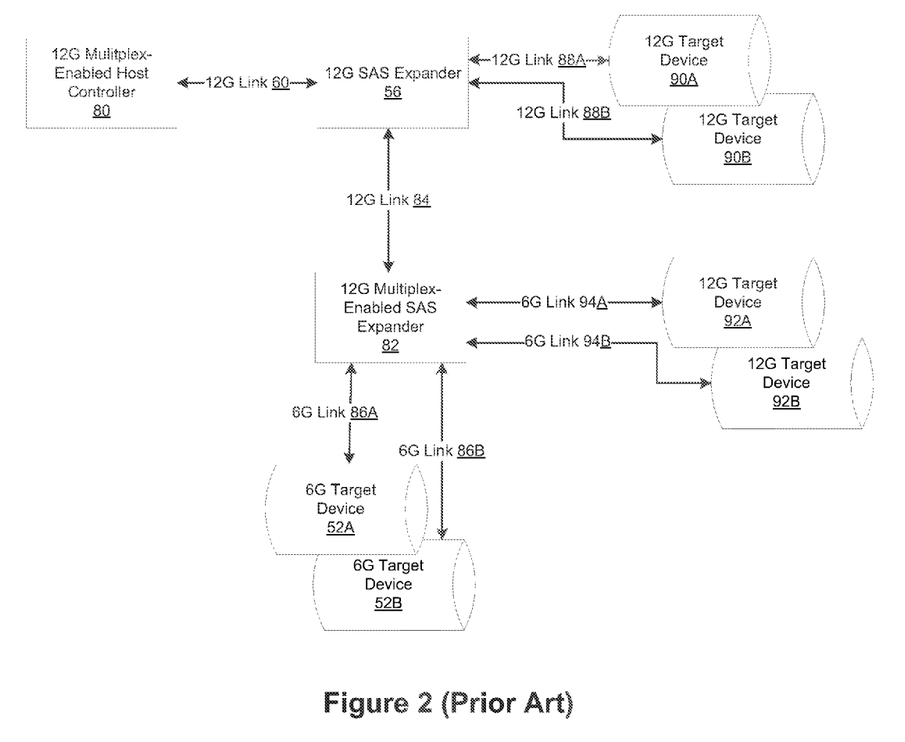
FIG. 2 is a schematic representation of a known storage area network showing the reduction of a drive-side connection link rate when connected to a fast target device due to multiplexing.

The arrangement of FIG. 2 results in the disadvantage, however, that a link from the host controller 80 to any 12G devices via the multiplex-enabled expander 82, such as 12G target devices 92A, 92B, is similarly limited to 6G via links 94A, 94B; in other words, the 12G host controller 80 cannot link at 12 Gbps to the 12G target devices 92A, 92B through that multiplex-enabled SAS expander 82. Consequently, the location of 12G target devices in the topology is practically limited once a particular host device is connected to a multiplex-enabled SAS expander, as in such case it would not be feasible to communicate through that expander with a 12 Gbps device at a 12 Gbps rate.

U.S. Pat. No. 7,539,798 to Voorhees et al. describes a device for addressing delays caused by attachment of a SATA drive to a SAS domain resulting from different effective data transfer rates between SATA and SAS. Voorhees et al. teach that data transfers between a SAS initiator and a SAS drive in a SAS domain may be delayed due to the usage of intermediate links by an inefficient SATA drive also connected to the SAS domain. A SATA degradation mitigation device ("SDMD") is described which, during a read transaction from a SATA drive, receives and buffers data at a relatively lower rate and transmits the buffered data at a higher rate to the SAS domain. During a write transaction, the SDMD receives and buffers data from a SAS initiator at a higher rate, allowing disconnection from the intermediate links and subsequently sending the data at a lower rate to the SATA drive. Voorhees et al. do not address the problem, however, of optimizing connections between SAS initiators and SAS drives, and in particular between fast SAS initiators and slow SAS drives. Moreover, Voorhees et al. do not specify any particular utilization of the respective SAS and SATA protocols in order to optimize buffering between SAS initiators and SATA drives.

Accordingly, there remains a need for means to optimize data transfers between SAS initiators and SAS and SATA drives including when the SAS initiators on the one hand, and the SAS or SATA drives on the other, operate at different effective data transfer rates.

BRIEF DESCRIPTION OF THE DRAWINGS

The embodiments described below may be understood with reference to the attached drawings, wherein.

DETAILED DESCRIPTION

Improved data transfer performance between hosts (or "host devices" or "host controllers") and SAS or SATA drives (or "drives", "target drives", "target devices", or "targets" more generally) in a SAS domain may be achieved by optimizing utilization of host links in the SAS domain. Inefficiencies in host link utilization may result from occupying a fast host link with a slow data transfer—as illustrated in FIG. 1 and discussed above. Host-link utilization inefficiency may also arise from the need to open and close the host-side link repeatedly; this may result from the limited native buffer size of typical drives, or from the need to transfer relatively small amounts of data, such as a single control frame. In both cases, data transfer performance suffers because the host link is occupied unnecessarily and is prevented from connecting to other drives.

Host link utilization may be optimized, therefore, by buffering both data and control frames and opening a connection to the host when the entirety or as large a portion of a data transfer as possible may be transferred at once to the host at the fast host link speed, and closing the host link connection otherwise thus enabling the host to connect to other drives. In particular, the SAS protocol provides for the transmission of multiple data frames back-to-back, and thus provides further opportunity to generate efficiencies in data transfer by buffering both data and control frames until such time as the host-side link may be optimally utilized, i.e. the entirety or as large a portion as possible of a data transfer may be communicated at the fast, host-side link speed while avoiding unnecessary opening-and-closing of the link to transmit single control frames.

Improved data transfer performance through host-link optimization may be achieved, therefore, by providing in a SAS domain a device having a SAS/SATA store-and-forward (SSSF) buffer (an "SSSF device"), and by providing a method for buffering control and data transfers between hosts and drives in the SAS domain.

Figure 3:
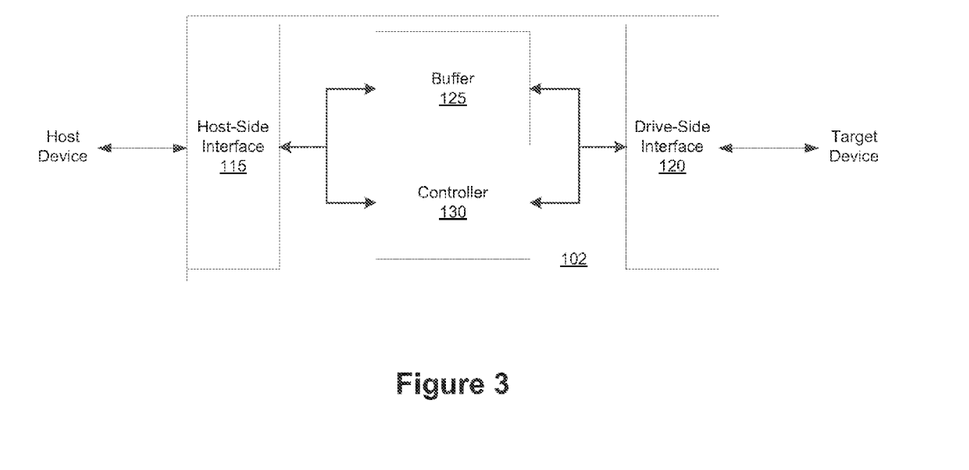
FIG. 3 is a schematic representation of an SSSF device according to an embodiment of the present disclosure for efficiently rate-matching hosts and target devices in a storage area network.

FIG. 3 illustrates an SSSF device 102 comprising a host-side interface 115 and a drive-side interface 120. By "host-side interface", it will be understood that the link or links connected to this interface lead eventually to a host device, but may traverse any number of other devices including expanders in the SAS domain, and generally connects the SSSF device to the SAS domain. The drive-side interface 120 may be linked to a corresponding SAS or SATA drive (or "drive", generally). The SSSF device further comprises a buffer 125 and a controller 130 comprising control logic which provides the SSSF device 102 with the functionality described herein. The buffer 125 is configured to receive data frames, which may be SAS frames or SATA frame information structures (FIS's), from the host-side interface 115 or the drive-side interface 120. The controller 130 may be coupled to the buffer 125 to control communication of the data frames between the buffer 125 and the host at the host-side rate and to control communication of the data frames between the buffer 125 and the drive at the drive-side rate.

The SSSF device 102 may form a standalone device connecting a drive to the SAS domain. Alternatively, the SSSF may be integrated in or form a component of an expander. In a further alternative, the SSSF device may be integrated in or form a component of a drive for use when the drive is connected to a SAS domain.

Figure 4:
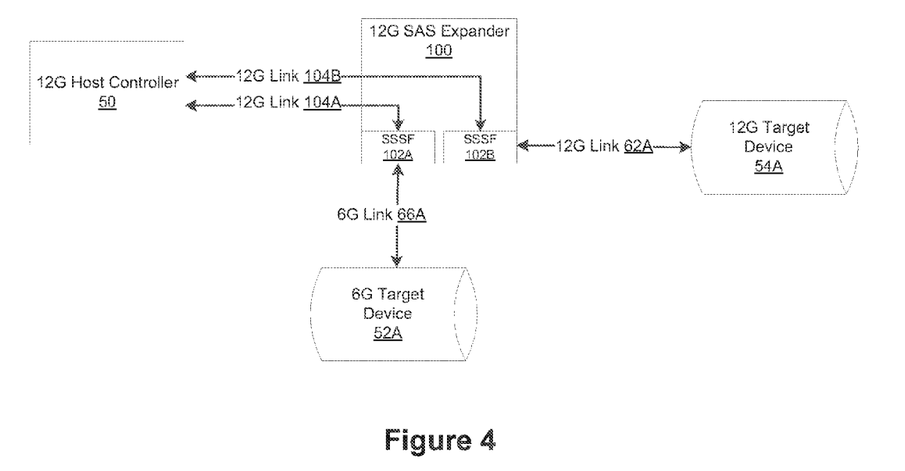
FIG. 4 is a schematic representation of an storage area network according to an embodiment of the present disclosure including an SAS expander incorporating the SSSF device shown in FIG. 3.

For the purposes of illustration, an embodiment wherein the SSSF device is integrated in or forms a component of a SAS expander is shown in FIG. 4. The SAS domain shown in FIG. 4 contains both fast and slow target devices. The domain includes a 12G host controller 50, 6G target device 52A, 12G target device 54A, and a 12G SAS expander 100. The SAS expander 100 includes SSSF devices 102A, 102B, each being an instance of the SSSF device 102 illustrated in FIG. 3. SSSF device 102A is connected to 6G target device 52A, and SSSF device 102B is connected to 12G target device 54A. The host controller 50 may interconnect via a 12G link 104A to SSSF device 102A, and via a 12G link 104B to SSSF device 102B.

It will be understood that two SSSF devices 102A, 102B are shown for illustrative purposes only, but that in general an expander may be provided with as many SSSF devices as it has phys, with each SSSF device being connected to a corresponding target device.

Each SSSF device 102A, 102B achieves improved data transfer performance by one or a combination of two aspects as follows.

In a first aspect, SSSF device 102A improves utilization of fast host link 104A when the host 50 connects with relatively slower 6G target device 52A by pre-staging or buffering data frames. The SSSF device 102A may be configured to receive or transmit data on its host-side interface at a first rate, or "host-side rate", and to receive or transmit data on its drive-side interface at a second rate, or "drive-side rate", which is slower than the host-side rate. The SSSF device 102A may be configured so as to close a connection over host-side link 104A whenever no data units are waiting to be received or transmitted to host 50 at the host-side rate. The SSSF device 102A may operate to ensure that a fill level of its SSSF buffer (or "buffer state") enables communication of a preconfigured amount of data, or number of data units, with the host 50 at the host-side rate while a connection with the host over link 104A is open. If further data units remain to be communicated, a connection over host-side link 104A may be closed until the SSSF device 102A is again ready to communicate the pre-configured number of data units at the host-side rate at which time a connection over host-side link 104A may again be opened. By closing the connection over host-side link 104A, the host 50 is thereby freed to communicate with other targets, thus improving utilization of the host link 104A.

Thus, an SSSF device may be configured to operate its host-side interface and drive-side interface at the respective speeds of the SAS host and SAS/SATA drive connected thereto, and may thus be used to bridge 6G to 3G, 12G to 3G, 12G to 6G and faster host link rates.

In a second aspect, SSSF device 102B improves utilization of the corresponding host link 104B, connecting to fast target device 54A, by buffering control frames in order to avoid inefficiencies which result when a host-side connection over link 104B is opened and closed to communicate a control frame when the control frame is received. SSSF device 102A may similarly improve utilization of the corresponding host link 104A. In either case, the corresponding SSSF device 102A, 102B may be configured to monitor its respective host-side interface and communicate the buffered control frame to the host 50 when more efficient conditions arise as compared to the conditions existing when the control frame was initially received. For example, the control frame may be buffered until a further packet is ready to be transferred to the host, and the packet may be a further control frame or a data frame such as a SAS data frame or SATA data FIS. In the meantime, the host device 50 is again freed to communicate with other targets, again improving utilization of the host link 104A, 104B.

Figure 5:
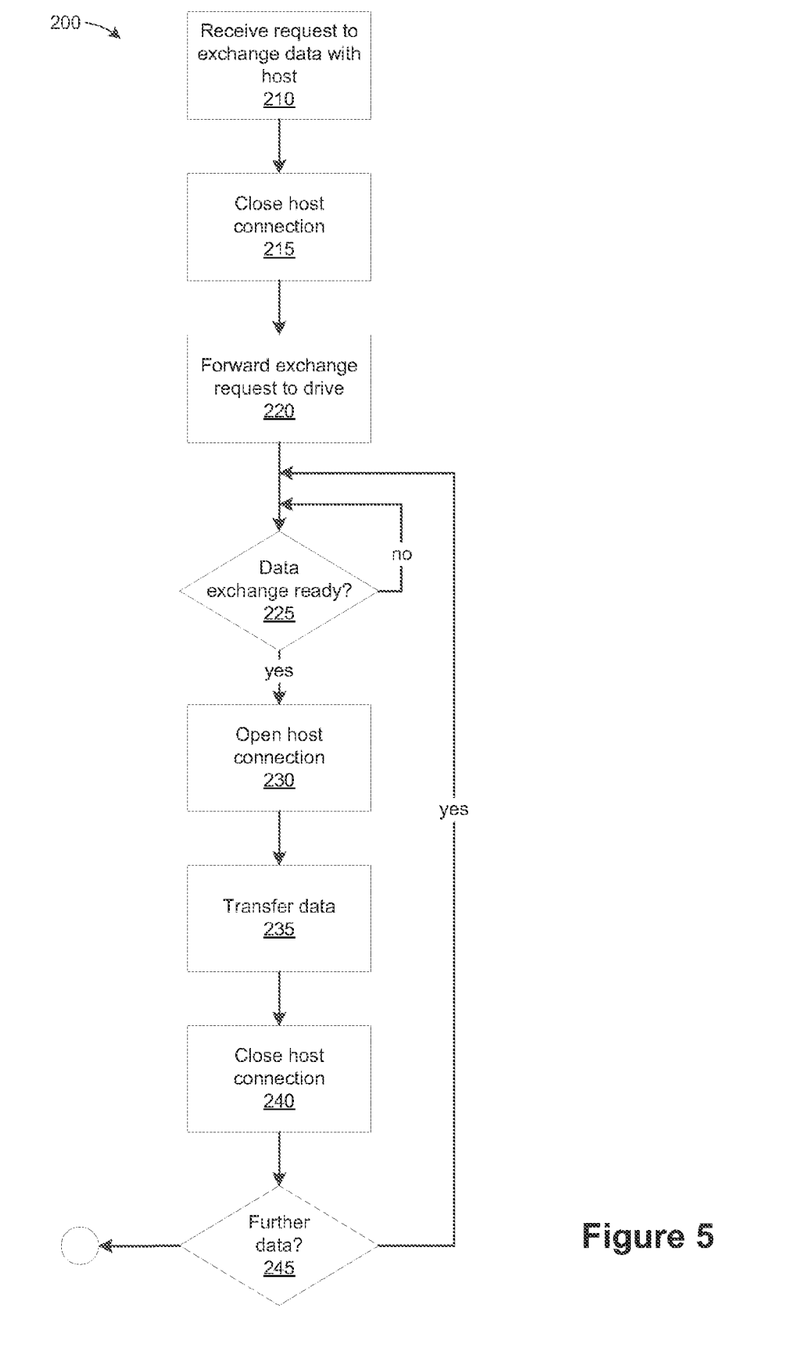
FIG. 5 is a flow chart illustrating a method for improving data transfer performance according to an embodiment of the present disclosure.

Thus, and with reference to FIG. 5, the SSSF device may be configured to perform a method 200 as follows. The SSSF device receives from the host a request to exchange data with the host (step 210). The data exchange requested may be a read or a write to a drive. The host will have opened a connection for this purpose, and the SSSF device closes the host connection (step 215). The SSSF device forwards the exchange request to the drive (step 220). The SSSF device then determines whether a predetermined number of frames or amount of data may be exchanged with the host at the host-side rate (decision 225). This determination may be based on one or more of the following factors: the number of SSSF buffers available (fill position of the buffer); the network and intermediate node latencies for the host-side connection to be established (host connection delay); and the respective connection rates for the host and drive.

In the case of a read, the buffer fill position at any time may depend upon the number of data frames received thus far from the drive. Host-link utilization may be optimized by waiting until as much data as the host may receive and the SSSF device may transmit at once, or otherwise a predetermined amount, may be transmitted over the host-side link. The determination is therefore directed to waiting until a predetermined number of data frames have been received in the buffer before opening a connection to the host to transmit the data.

In the case of a write, the buffer fill position at any time may depend upon the number of data frames waiting in the buffer to be transferred to the drive. Again, host-link utilization may be optimized by waiting until as much data as the host may transmit and the SSSF device may receive at once, or otherwise a predetermined amount, may be transmitted over the host-side link. Data frames previously received from this host or another source which are occupying the buffer must first be transmitted to the drive and the buffers freed. The determination is therefore directed to waiting until a predetermined number of buffers are free before opening a connection to the host to receive the data.

Once it is determined that the predetermined number of frames or amount of data may be exchanged with the host at the host-side rate (decision 225), a host connection is opened (step 230), the data is transferred (step 235), and the host connection is closed (step 240). If further data frames are to be exchanged in this read or write operation (decision 245), then the above repeats until all data frames in the read or write operation have been exchanged.

Inasmuch as the target device may be a SAS or SATA drive, the SSSF device may be configured to communicate with SAS and SATA drives in accordance with the corresponding protocol, and to perform methods employing each protocol so as to optimize transmission of command and data frames between hosts and drives.

For SAS drives, the SSSF device provides a link level bridge solution that manipulates the SAS credit flow control and error handling. Supporting SAS transport layer retries TLR may require additional complexity of tracking outstanding TTT values. Alternatively, the solution need not support TLR and may instead modify the mode page query to prevent a device from advertising this capability.

For SATA drives, the SSSF device allows host devices to connect to SATA drives at a higher rate than the SATA drive link rate. The SATA tunneled protocol (STP) bridge within the SAS expander link layer (SXL) of an edge SAS expander device may operate at the host link rate (minimizing its latency) while the device may operate at the slow link rate. While normal SATA flow control can handle this link rate difference with a FIFO and HOLD/HOLDA, the bridge solution manipulates the SATA protocol to properly segment large data transfers into buffer-able chunks in a manner compatible with known SAS host controllers. The solution also allows the SATA device to operate with multi-affiliation, that is multiple hosts within the SAS topology may access the SATA device as if they each have a "lock" or affiliation on the drive. In this mode, the bridge adapts the ATA protocol to prevent protocol collisions between the multiple hosts; however, the bridge need not virtualize the device to prevent write collision between hosts.

In one embodiment, the SAS domain may include at least one SAS drive connected to or cooperating with an SSSF buffer to connect to the host. In a further embodiment the SAS domain includes at least one SAS drive and at least one SATA drive, wherein each connects to or cooperates with a respective SSSF buffer to connect to the host. In general, any combination of fast and slow drives, either SAS or SATA, and any number of additional hosts, target devices, and expanders may be provided, and the principles described herein will remain applicable to achieve the described functionality.

As noted above, the target device connected to the drive-side interface 120 of each SSSF device may be an SAS or SATA drive, and data units exchanged with the target device may be SAS frames or SATA frame information structures (FIS), respectively. The host-side interface 115 may be connected to an SAS initiator which may be host controller 50. As illustrated in FIG. 4, such connection may be made through one or more intermediate SAS expanders such as expander 100.

The particular operation of the SSSF to achieve the desired functionality will depend upon whether the target device is an SAS drive or an SATA drive. FIGS. 6 to 9 show sequence diagrams illustrating embodiments of SCSI and SATA read and write operations. It will be understood, however, that alternatives may be provided which accord to the principles specified herein and the respective protocols applicable to SAS and SATA drives. For the sake of convenience, the illustrated methods are based on embodiments where the SSSF device is incorporated in an edge expander connected to the drive, though it will be understood that the SSSF could alternatively be embodied or cooperate with the drive itself, as noted above.

Figure 6:
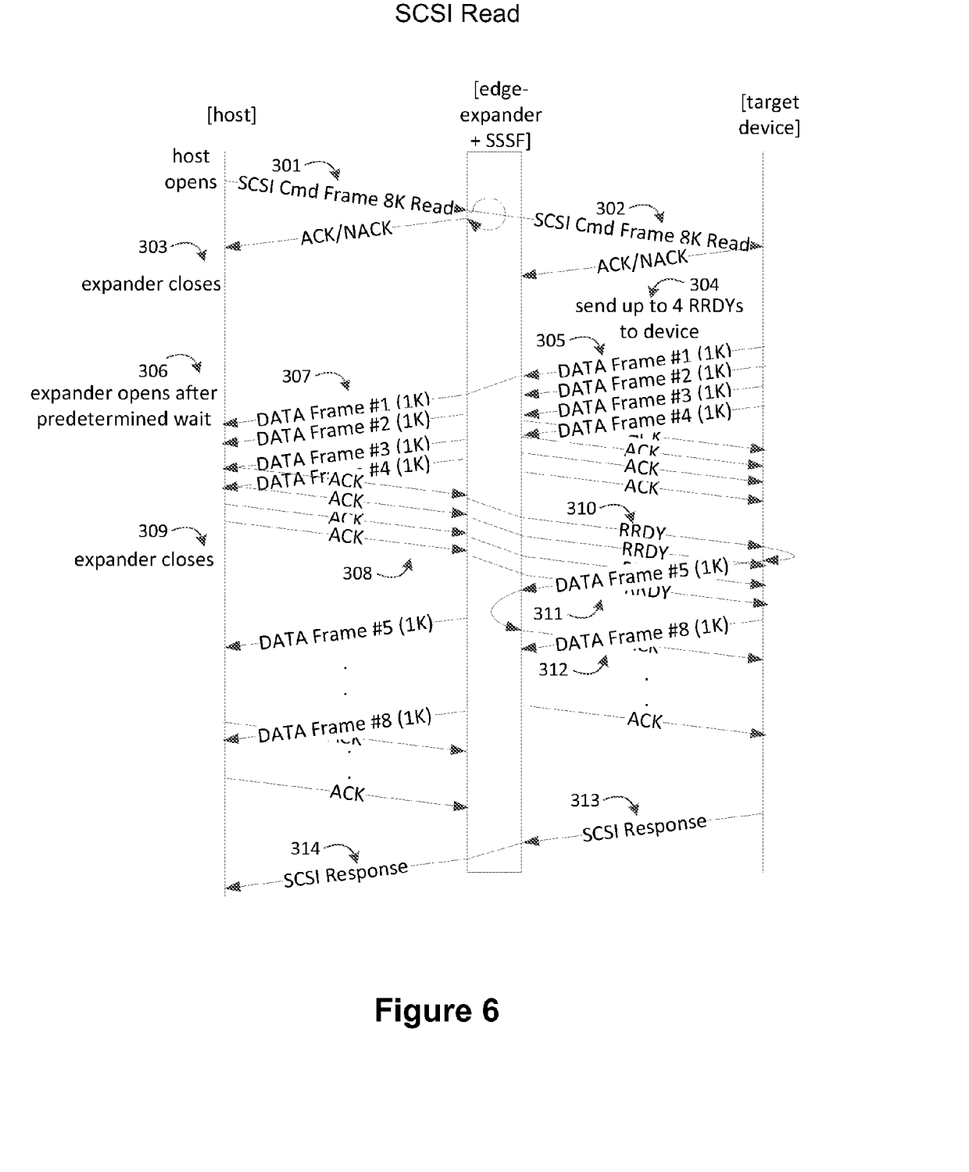
FIG. 6 is a sequence diagram illustrating a SCSI read operation according to an embodiment of the present disclosure.

Thus, FIG. 6 shows a sequence diagram illustrating a SCSI read operation from a SAS drive. The SSSF device receives a SCSI Read COMMAND frame from the host (step 301) and forwards it to the drive (step 302). While awaiting a response, the host-side connection may be closed by the SSSF device (step 303). The SSSF device may send a number of RRDY primitives to the drive depending on the number of buffers available (step 304). (For the sake of illustration only, and without limitation, where the SSSF buffer possesses only as much as 4K buffers in each direction for SAS, the SSSF would send as many as four RRDY's to the drive.) The drive then prepares and sends to the SSSF device a number of DATA frames based on the number of RRDY's granted by the SSSF device.

Once a first one of the DATA frames is received from the drive (step 305), the SSSF may wait for a predetermined period and then opens a connection to the host (step 306). In general the predetermined period may be determined so as to ensure that all of the DATA frames will be transmitted to the host at the host-side rate, and this determination may depend upon such factors as: the number of buffers available for the drive to fill (fill position of the buffer); the network and intermediate node latencies for the host-side connection to be established (host connection delay); and the respective connection rates for the host and drive. The SSSF may monitor the host connection for this purpose. For example, assuming a host-side rate of 12G and a drive-side rate of 6G, if there are four SSSF buffers available and network latency is equivalent to one buffer, the host-side connection would be opened after three buffers are filled from the device.

Following the predetermined waiting period, a connection to the host may be opened by the SSSF device and the DATA frames may be transmitted to the host at the host-side rate (step 307). Following completion of the transmission, e.g. following the receipt by the SSSF device of any final ACK from the host (step 308), the host-side connection may again be closed (step 309). As each ACK is received from the host, the SSSF device may empty each corresponding buffer and then send a RRDY primitive to the drive (step 310) which in turn sends further corresponding DATA frames to the SSSF device (step 311).

The above procedure repeats until a final DATA frame is sent by the drive (step 312) following which the drive may send a SCSI RESPONSE frame (step 313). The SSSF may then forward the SCSI RESPONSE frame immediately following transmission of the final DATA frame to the host (step 314), and the host-side connection may be closed immediately thereafter. Alternatively, the SSSF may hold the RESPONSE frame internally in the SSSF buffer and send it along with a next XFER_RDY or other frames in the direction of the host to optimize opening of the host-side connection.

Figure 7:
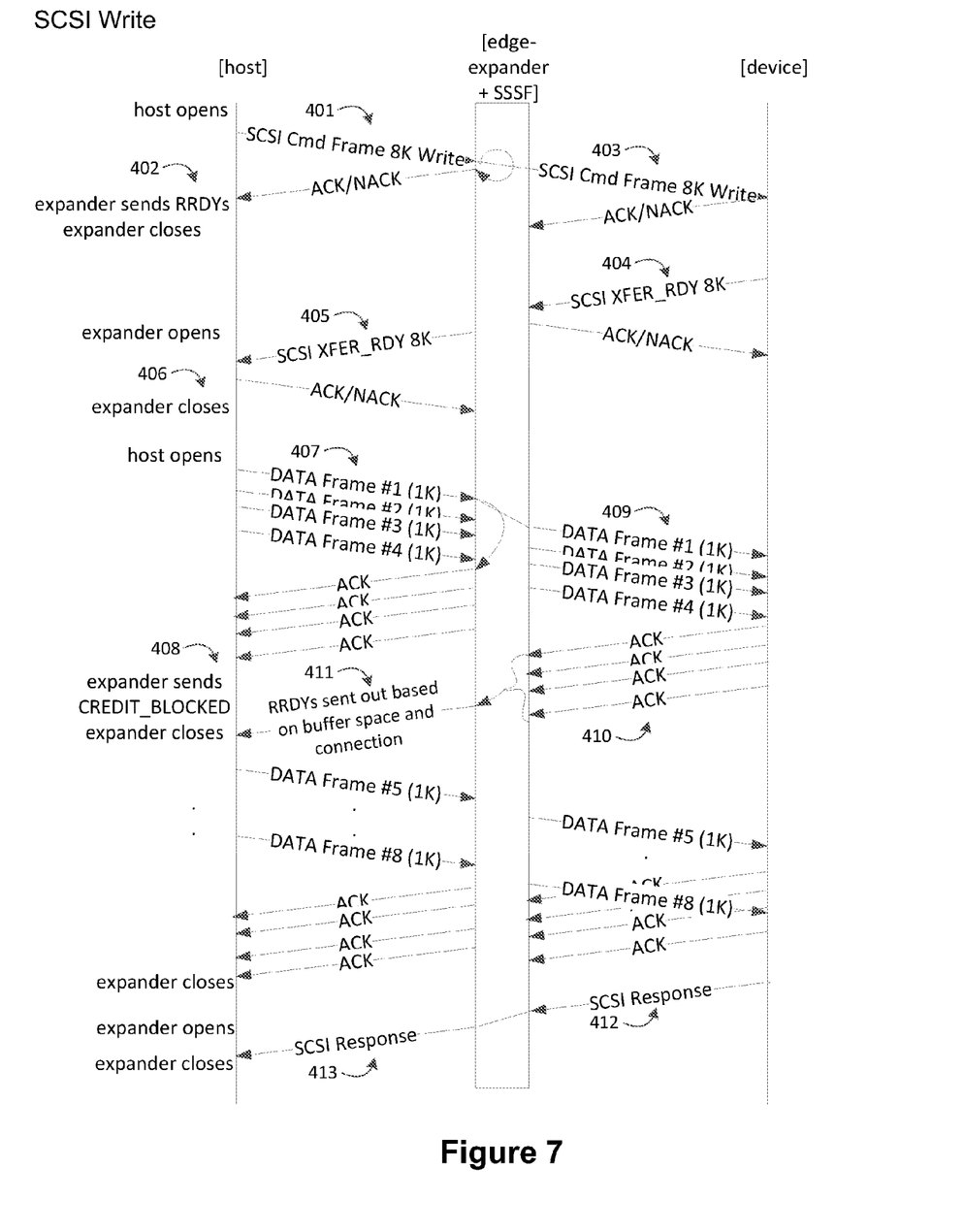
FIG. 7 is a sequence diagram illustrating a SCSI write operation according to an embodiment of the present disclosure.

FIG. 7 shows a sequence diagram illustrating a SCSI write operation to a SAS drive. The host opens the host-side connection and sends a SCSI write COMMAND frame to the SSSF (step 401) which responds with a number of RRDY primitives depending on the number of buffers available; the host-side connection may then be closed (step 402). In the meantime, the COMMAND frame may be forwarded by the SSSF to the SAS drive (step 403) which subsequently responds with an XFER_RDY frame (step 404), and the SSSF then opens the host-side connection and forwards the XFER_RDY frame to the host (step 405). The host-side connection may be closed by the SSSF (step 406) following a predefined period.

In order to take account of the size of the SSSF buffer, the SSSF device may split a XFER_RDY frame received from the SAS drive into multiple smaller XFER_RDY frames. By this it is meant that the SSSF device creates and sends to the host multiple XFER_RDY frames which together specify an aggregate data size equal to that specified in the XFER_RDY received from the drive, but wherein each such XFER_RDY frame created by the SSSF device specifies a data size less than or equal to the SSSF buffer size. For example, the SAS drive may send to the SSSF device an XFER_RDY for 64K of data, whereas the SSSF buffer may hold only 32K. In this case, the SSSF device may create and send to the host, one at a time, two XFER_RDY's each specifying 32K, thus together summing to the original 64K.

The host would reopen the host-side connection when ready to transmit DATA frames (step 407). After a predetermined number of DATA frames corresponding to the number of RRDY's received from the SSSF have been communicated from the host to the SSSF (and ACKed, as the case may be), the SSSF sends a CREDIT_BLOCKED primitive to the host (step 408) and closes the host-side connection after a predefined period of time. In the meantime, as each DATA frame is received by the SSSF and buffered it is sent to the SAS drive (step 409) and as each DATA frame is ACKed by the SAS drive the corresponding SSSF buffer is freed (step 410).

Before reopening the host-side connection in order to send further RRDYs to the host the SSSF device waits until a pre-determined number of buffers are available. As above the predetermined number of buffers is determined so as to ensure that all of the DATA frames to be received from the host will be communicated at the host-side rate and this determination may depend upon the same or similar factors as specified above in connection with the read operation. The SSSF device may further refuse any attempted connection from the host until the pre-determined number of buffers are available.

Once the predetermined number of buffers become available, and the SSSF accepts a connection from the host the SSSF sends further RRDY primitives to the host according to the number of free buffers available (step 411), and the above procedure repeats until all DATA frames have been received from the host. The SAS drive would send a SCSI RESPONSE frame to the SSSF (step 412), which would then open the host-side connection to forward the RESPONSE frame (step 413) and then close the connection by sending DONE/CLOSE.

Thus, it will be understood that the foregoing methods ensure efficient utilization of the host-side connection by ensuring that during both read and write operations the host-side connection is open only while frames may be communicated at the host-side rate. The host-side connection is otherwise closed so as to free the host to communicate with other targets. At the same time, host connection delay and buffer fill state are monitored so as to enable opening of the host-side connection as soon as possible to transmit further data thereby also ensuring efficient data transfer to and from the target drive.

As indicated above, the target device connected to the drive-side interface may be either a SAS or a SATA drive. The operation of the SSSF device when the target device is a SATA drive will now be described.

Figure 8:
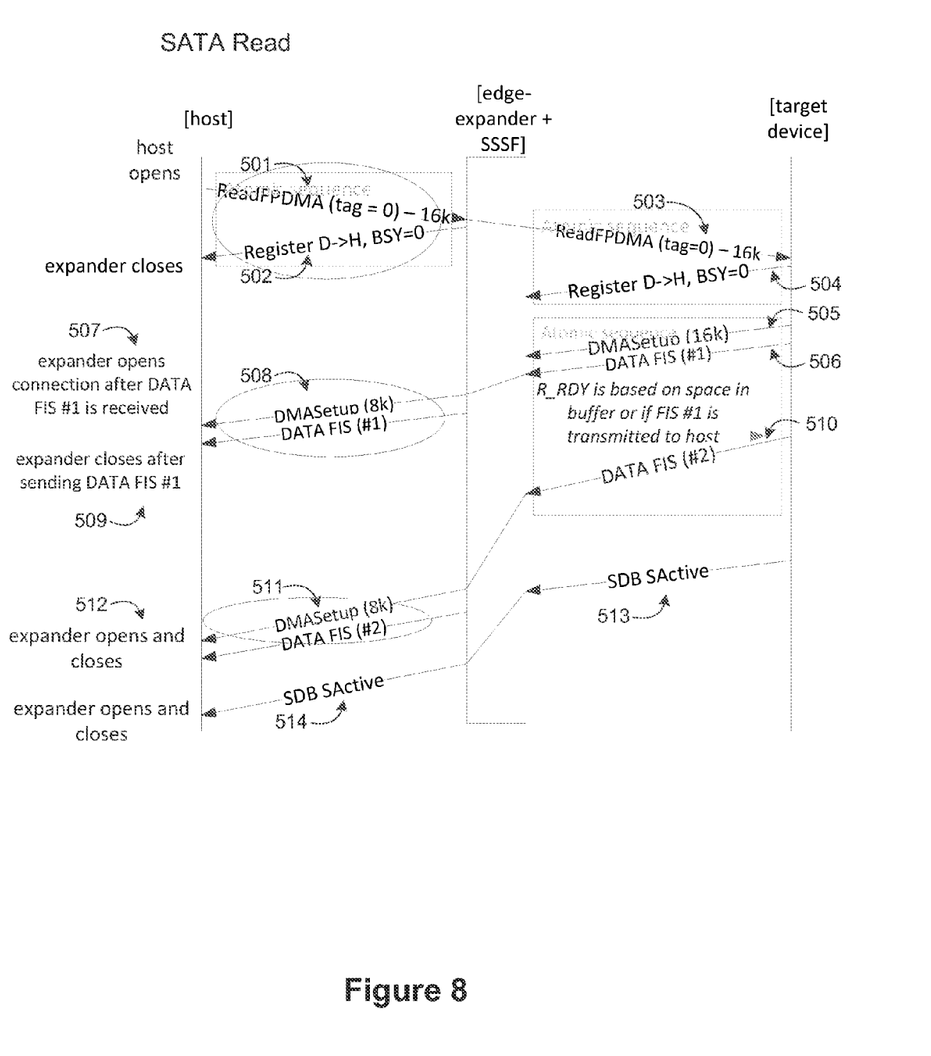
FIG. 8 is a sequence diagram illustrating a SATA read operation according to an embodiment of the present disclosure.

FIG. 8 shows a sequence diagram illustrating a SATA first-party direct memory access (FPDMA) read operation. The host initially opens a connection to the SSSF and sends a Read FPDMA H2D FIS to the SSSF (step 501). The SSSF may capture the active TAG and send a Register D2H FIS in response with BSY=0 to the host and initiate for connection CLOSE (step 502). Subject to error-handling by the SSSF, the Read H2D FIS is sent to the SATA drive (step 503) which returns D2H FIS with BSY=0 (step 504) which is checked for consistency and then is discarded. When ready, the SATA drive sends to the SSSF a D2H DMA Setup FIS for the particular TAG (step 505). This FIS may be stored until the SATA drive sends the first data FIS.

Once the SSSF buffer begins to receive and store the first data FIS, the SSSF may wait for a predetermined period and then initialize a connection to the host (step 507). As above, the predetermined period may be determined so as to ensure that the entire data FIS will be transmitted to the host at the host-side rate, and this determination may depend upon the same factors specified above. In front of the first data FIS, the SSSF sends the DMA Setup FIS modified to indicate a buffer's worth of data followed by the buffered data FIS (step 508), after which the SSSF triggers the upstream SXL to close the connection to the host (step 509). Alternatively, the DMA Setup FIS may be sent without modification to indicate the entire number of data units being transferred.

As the SSSF buffer empties, the SSSF may allow the next data FIS to arrive from the SATA drive (step 510). In this case, the SSSF does not wait for the buffer to empty before allowing the next data FIS from the drive to be transferred. The act of sending an X_RDY primitive sequence to the SXL will cause the SXL to open the SAS connection. If data FIS's remain to be received from the SATA drive, the SSSF creates DMA Setup FIS's for the next number of data units which are then fetched from the drive. When the next data FIS is stored in the buffer (or the buffer is full enough, as discussed above), the SSSF opens the connection to the host and sends the next DMA Setup FIS followed by the next Data FIS (step 511). If the original DMA Setup FIS specified the full amount, only the next DATA FIS is sent. The connection would then be immediately closed (step 512). The procedure repeats until the entire data read is completed.

In the event the predetermined waiting period is set too short, the SSSF buffer will empty resulting in a HOLD/HOLDA event. The SSSF device may be configured to increase the predetermined waiting period and hence the target buffer fill level achieved before initializing the host connection. In such case, the SSSF device may be configured to increase the target buffer fill level by predetermined increments until no further HOLD/HOLDA events occur. In this way, the optimal buffer fill level may be determined empirically.

When a service device bits (SDB) FIS is received from the SATA drive (step 513), the SSSF tracks the change in TAG status and may then forward the SDB to the host and actively close the SAS connection (step 514).

Figure 9:
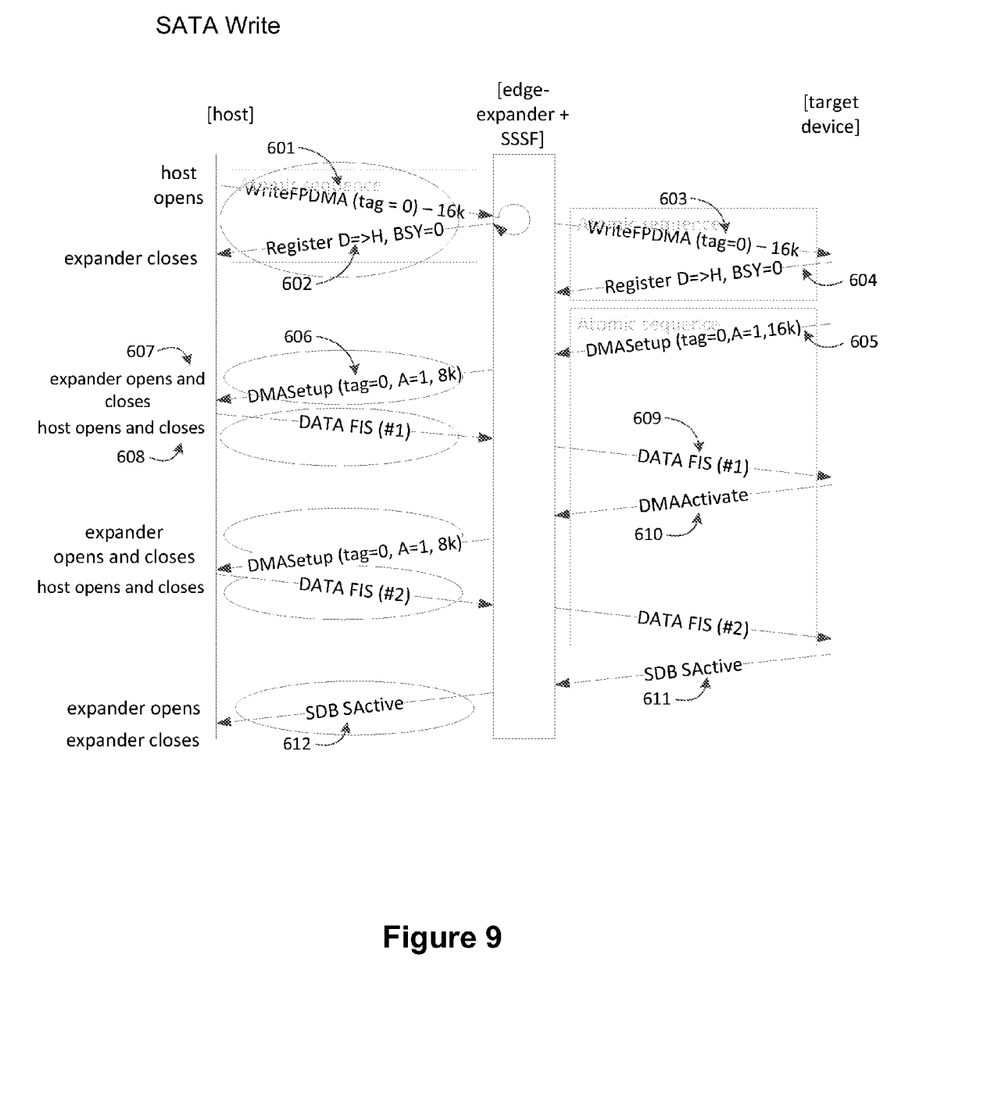
FIG. 9 is a sequence diagram illustrating a SATA write operation according to an embodiment of the present disclosure.

FIG. 9 shows a sequence diagram illustrating a SATA FPDMA write operation. The host sends a Write FPDMA H2D FIS to the SSSF (step 601) which may capture the active TAG and send a Register D2H FIS in response with BSY=0 to the host and initiate for connection CLOSE (step 602). Subject to any error-handling, the H2D FIS is sent to the SATA drive (step 603) which returns D2H FIS with BSY=0 (step 604) which is checked for consistency and may then be discarded.

Subsequently, the SATA drive sends back to the SSSF a D2H DMA Setup FIS for the given TAG value (step 605). If the auto-activate bit is not set within the DMA Setup FIS, then the SSSF may wait until a DMA Activate is received. Alternatively, the SSSF may begin requesting data from the host before receiving the DMA Activate from the drive, in which case the SSSF may be filled, the host-side connection closed, and then the SSSF may wait for the DMA Activate from the drive.

In general, if the SSSF buffer is sufficiently empty to receive a data FIS from the host, a connection may be opened to the host by sending the DMA Setup FIS with the Auto-Activate bit set (step 606). As above, the SSSF control logic may determine that the SSSF buffer is sufficiently empty when the entire data FIS may be communicated at the host-side rate, and this determination may be made based on the factors indicated above.

The SSSF may then immediately close the host-side connection and wait for the host to open a connection back to send a data FIS (step 607). Alternatively, the SSSF may wait for a predetermined period of time to see if the host sends back a data FIS within the same connection failing which the SSSF closes the connection. For example, the predetermined period may be based on a predetermined amount of time required to open and close the host connection, which in one embodiment may be 0.5 μs.

Based on the size of the SSSF buffer, the DMA Setup FIS may be split into multiple DMA Setup FIS's together specifying the same aggregate amount of data. Alternatively, the selective issuance by the SSSF of DMA Activate FIS's may be used to control the transfer of data on a packet-by-packet basis. By withholding the DMA Activate and actively closing the SAS connection, the SSSF can optimize the efficiency of the host-side link and preserve the atomic sequence at the host. The SSSF will generally be able to open the host-side connection and trigger the DMA Activate before the SSSF buffer is empty.

When ready, the host will send a data FIS, opening and closing the connection as required (step 608). It will be understood that in any instance either the host or the SSSF device may close the connection. The SSSF may start sending the DATA FIS to the SATA drive as soon as it receives a first DWORD in the buffer (step 609). After the DATA FIS is transferred, the drive may then send a DMA Activate FIS for the next DATA FIS (step 610). The above procedure may then be repeated until the last FIS of the write command is sent to the SATA drive. The drive may then respond with an SDB (SActive) indicating that the command has completed (step 611). The SSSF may then open a connection to the host by sending the SDB and then actively close the host-side connection (step 612).

Thus, as in the case where the target device is a SAS drive, it will be understood that the foregoing methods ensure efficient utilization of the host-side connection by ensuring that during both read and write operations the host-side connection is open only while DATA FIS's may be communicated at the host-side rate. The host-side connection is otherwise closed so as to free the host to communicate with other targets and optimize host network utilization.

In general, while specific speeds/link rates are referenced herein, including 3G, 6G, and 12G, and appear in and characterize the exemplary embodiments described below, it will be understood that these particular speeds/link rates are implementation dependent and the principles, devices, and methods disclosed herein may be adapted so as to employ or address any particular speeds/link rates as are useful, available, or relevant in any alternative implementation.

Optionally, when the drive-side rate is slower than the host-side rate, the SSSF device may nevertheless inform the host that the drive-side interface is operating at the host-side rate. Also, when an SAS OPEN address frame is sent from the host-side interface to the drive-side interface, the SSSF controller may be configured so as to change the requested connection rate to match the drive-side rate.

It will be understood that reference herein to "target device", "target", "drive", "hard drive", and so forth are all intended to designate a target storage device including SAS and SATA drives as are known in the art. Moreover, it will be understood that "host", "host controller", "host device", and so forth are all intended to designate an SAS initiator.

It will be understood herein that, depending on the context of usage, the term "packet" may encompass both data frames and control frames, that "data frame" may encompass both SAS data frames and SATA data FIS's, and that "control frame" may encompass both SAS and SATA command and response frames.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A device for improving data transfer performance within a serial attached SCSI (SAS) domain comprising a host and a target, the host comprising a SAS initiator, the target comprising a SAS drive or a serial ATA (SATA) drive, the device comprising:
   a host-side interface configured to communicate with the host at a host-side rate;
   a drive-side interface configured to communicate with the target at a drive-side rate, the drive-side rate being equal to or slower than the host-side rate;
   a buffer configured to receive and store data frames from the host-side interface or the drive-side interface, wherein the data frames are SAS frames when the target comprises the SAS drive, and wherein the data frames are SATA frame information structures (FIS's) when the target comprises the SATA drive; and
   control logic coupled to the buffer to control communication of the data frames between the buffer and the host at the host-side rate, and to control communication of the data frames between the buffer and the target at the drive-side rate.

2. The device according to claim 1, wherein the target is the SAS drive and the control logic is configured to transmit a CREDIT_BLOCKED primitive to the host when the buffer is full.

3. The device according to claim 1, wherein the device is integrated within a SAS expander.

4. The device according to claim 1, wherein the control logic informs the host that the drive-side interface operates at the host-side rate when the drive-side rate is slower than the host-side rate.

5. The device according to claim 1, wherein the control logic changes a connection rate of an open address frame to the drive-side rate when the open address frame is received from the host to be sent to the target.

6. The device according to claim 1, wherein the control logic monitors a host connection delay and causes the host-side interface to open a connection with the host to communicate data frames with the host based on the host connection delay, a fill position of the buffer, the host-side rate, and the drive-side rate.

7. The device according to claim 1, wherein the control logic closes a connection to the host to optimize host network utilization.

8. The device according to claim 1, wherein the target is a SATA drive and the control logic splits a direct memory access (DMA) setup FIS into multiple smaller DMA setup FIS's.

9. The device according to claim 1, wherein the target is a SATA drive and the control logic supports multi-affiliation of a number of SATA drives including the target.

10. The device according to claim 1, wherein the target is a SAS drive and the control logic splits a XFER_RDY frame into multiple smaller XFER_RDY frames.

11. The device according to claim 1, wherein the host-side rate is 12 Gbps and the drive-side rate is 6 Gbps.

12. The device according to claim 1, wherein the control logic is configured to store in the buffer a control frame addressed to the host and to defer transmitting the control frame to the host until a further packet addressed to the host is received at the device, wherein the device is configured to transmit to the host the control frame together with the further packet, wherein the further packet is a further data frame, a further data FIS, or a further control frame.

13. The device according to claim 12, wherein the target comprises the SAS drive, the control frame is a RESPONSE frame, and the further packet is a XFER_RDY frame.

14. The device according to claim 12, wherein the target comprises the SATA drive, the control frame is a DMA Setup FIS, and the packet is a Data FIS.

15. A method for improving performance within a serial attached SCSI (SAS) domain comprising a host and a target, the host comprising a SAS initiator, the target comprising a SAS drive or a serial ATA (SATA) drive, the method comprising:
receiving a data transfer from one of the host and the target at a host-side rate or a drive-side rate, respectively, wherein the drive-side rate is equal to or slower than the host-side rate, wherein the data transfer comprises SAS frames when the target comprises the SAS drive, and wherein the data transfer comprises SATA frame information structures (FIS's) when the target comprises the SATA drive;
buffering the data transfer within a buffer located between the host and the target; and
transmitting the buffered data to the other one of the host and the target at the host-side rate or the drive-side rate, respectively.

16. The method according to claim 15, wherein the target comprises the SAS drive, the method further comprising transmitting a CREDIT_BLOCKED primitive to the host when the buffer is full.

17. The method according to claim 15, further comprising informing the host that the drive-side interface operates at the host-side rate when the drive-side rate is slower than the host-side rate.

18. The method according to claim 15, further comprising changing a connection rate of an open address frame to the drive-side rate when the open address frame is received from the host to be sent to the target.

19. The method according to claim 15, further comprising monitoring a host connection delay and opening a connection with the host to communicate data frames with the host based on the host connection delay, a fill position of the buffer, the host-side rate, and the drive-side rate.

20. The method according to claim 15 further comprising closing a connection to the host to optimize host network utilization.

21. The method according to claim 15, wherein the target comprises the SATA drive, the method further comprising splitting a direct memory access (DMA) setup FIS into multiple smaller DMA setup FIS's.

22. The method according to claim 15, wherein the target comprises the SAS drive, the method further comprising splitting a XFER_RDY frame into multiple smaller XFER_RDY frames.

23. The method according to claim 15, wherein the host-side rate is 12 Gbps and the drive-side rate is 6 Gbps.

24. The method according to claim 15 further comprising storing in the buffer a control frame addressed to the host and deferring transmission of the control frame to the host until a further packet addressed to the host is received at the device, and transmitting to the host the control frame together with the further packet, wherein the further packet is a further data frame, a further data FIS, or a further control frame.

25. The method according to claim 24, wherein the target comprises the SAS drive, the control frame is a RESPONSE frame, and the further packet is a XFER_RDY frame.

26. The device according to claim 24, wherein the target comprises the SATA drive, the control frame is a DMA Setup FIS, and the further packet is a Data FIS.

* * * * *